United States Patent Office 3,080,405
Patented Mar. 5, 1963

3,080,405
3,3-DIFLUOROALLYL ESTERS
Eric R. Larsen, Edgar M. Ilgenfritz, and Robert P. Ruh, Midland, Mich., assignors to The Dow Chemical Company, Midland, Mich., a corporation of Delaware
No Drawing. Filed Aug. 2, 1961, Ser. No. 128,648
27 Claims. (Cl. 260—408)

This invention contributes to the art of organic chemistry and, in particular, relates to a new alcohol, esters thereof and a method for their production. It more particularly relates to 3,3-difluoroallyl alcohol, its esters derived from carboxylic acids, and the preparation thereof.

The esters of the invention are of the general formula:

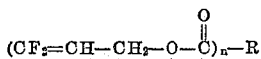

$$(CF_2=CH-CH_2-O-\overset{O}{\overset{\|}{C}})_n-R$$

wherein R is an organic carboxylate radical containing from 1 to about 20 carbon atoms, which radical may include an aromatic ring, and $n$ is an integer from 1 to 3 or hydrogen.

The values of R include, mono and polyvalent aliphatic radicals, including those being olefinically unsaturated, cycloalkyl and cycloalkenyl radicals, ethers both linear and cyclic phenyl benzyl alkaryl and aralkyl, including the hereinbefore delineated groups when modified by including such groups as nitro, keto, aldehyde, ester, ether, amide, amine salts, halogen such as chlorine, bromine and fluorine.

These compounds are oils or low melting crystalline solids. They are somewhat soluble in many organic solvents and usually of very limited solubility in water. They are generally stable to light and air.

The alcohol and esters of the present invention have utility as parasiticides and herbicides. They are employed with great advantage for control of such organisms as bean aphids, two spotted spider mites, houseflies, American cockroaches, confused flour beetles, worms, soybeans, radishes, Japanese millet, wild oats, water weed, fanwort, moneywort, salvinia and canary grass, among others.

Preparation of 3,3-difluoroallyl esters may readily be accomplished by contacting a halodifluorocarbon which is a compound of carbon, hydrogen, fluorine, and a halogen X, having a 3 carbon atom chain, two fluorine atoms and one X atom attached to one of its terminal carbon atoms, at least three hydrogen atoms attached to the other two carbon atoms, not more than one other X atom attached to a carbon atom which also carries 2 hydrogen atoms, and X is a halogen of atomic number from 17 to 53 (i.e., chlorine, bromine or iodine) with a carboxylic acid salt of an alkali metal having an atomic number from 3 to 37 (i.e., lithium, sodium, potassium and rubidium) in a solvent which is substantially nonreactive with the reactants and reaction products under the conditions employed; at a temperature from about 0° C. to about 250° C.

Usually it is desirable to employ substantially anhydrous reactants in preparing the compounds of the invention to facilitate obtaining satisfactorily adequate yields thereof.

The 3-halo-3,3-difluoropropene or 1,3-dihalo-1,1-difluoropropane may conveniently be prepared for the reaction by a fractional distillation to remove major contaminants which may be present, as for example, water and the like.

The alkali metal carboxylic acid salts employed in the practice of the present invention may be rendered substantially anhydrous by heating them to a temperature of about 300° C., then cooling the resultant mass. The resulting anhydrous salts may then be ground to a convenient particle size as, for example, about 1 to 2 millimeters in diameter, by any suitable grinding technique.

Solvents suitable for the reaction are substantially nonreactive under the conditions of the reaction with the reactants and reaction products. Some suitable solvents which may be employed in the practice of the invention are, for example, acetone, propanone, acetic acid, acetic anhydride, propionic acid, and the like. Solvents employed are advantageously rendered sufficiently water-free by intimate contact with anhydrous sodium sulphate or the like dehydrating reagent.

It is frequently advantageous to employ minor amounts of catalytic salts, such as, for example, potassium iodide, sodium iodide, potassium bromide and the like in order to increase the rate of the reaction.

Technical grade potassium iodide is quite satisfactory for employment as catalyst in the method of the invention. In addition, it is attractive from an economic point of view.

The mole ratio of carboxylic acid salt to 3-halo-3,3-difluoropropene or 1,3-dihalo-1,1-difluoropropane utilized in preparing the compounds of the invention may be varied from about 0.5 to 1 to about 5 to 1, respectively. Advantageously, a range of about 0.75 to about 2, respectively, is employed. Most advantageously a ratio of about 1.05 to about 1.25, respectively, is used.

The amount of solvent employed in the reaction is not critical. The reaction will proceed with good rates whether the carboxylic acid is wholly in solution or if it is the form of a slurry (hereinafter referred to as a dispersion). Generally, it is preferable to maintain a reaction mixture containing a minimum amount of solvent, since excess solvent tends to slightly reduce reaction rates and also necessitates unnecessary operations in order to isolate the desired products.

A suitable catalyst, such as potassium iodide, may be employed in a proportion of about 0.005 to about 0.2 mole thereof per mole of 3-halo-3,3-difluoropropene or 1,3-dihalo-1,1-difluoropropane. Generally, the mole ratio of catalyst to halohydrocarbon may be from about 0.02 to 0.15. Most advantageously, the ratio that is utilized is from about 0.03 to about 0.08 mole of catalyst per mole of 3-halo-3,3-difluoropropene or 1,3-dihalo-1,1-difluoropropane.

The reaction proceeds over the range of from about 0° C. to about 250° C. Advantageously, a range of about 25° C. to about 160° C. may be employed. More advantageously, a temperature within the range of 50° to 120° C. is utilized. In general, the rate of reaction is increased with increasing temperature. However, excessive subjection of the reaction mass to heat at temperatures above the upper limit of the range may cause dehalogenation to occur so as to result in decreased yields of the desired 3,3-difluoroallyl ester.

Advantageously, the autogenous pressure of the reactants at reaction temperature may be employed, although higher pressures may be obtained by superimposing an inert atmosphere over the reaction mixture.

Because of the widely varying nature of the carboxylic acids that may be employed in the practice of the invention, including such varied species as acetic acid, pimelic acid, benzoic acid, stearic acid, and the like, the reaction time will vary widely and may range from as little as from 30 minutes or less to as much as 200 hours or more. Usually, a period of from about 20 to about 100 hours is adequate to provide an advantageous yield of 3,3-difluoroallyl esters.

The order of addition and manipulation during charging of the reactants to the reaction vessel is not critical. It is usually convenient to use the following sequence: (1) add the catalyst and the potassium salt of the carboxylic acid; (2) add the solvent; (3) agitate until the solids are dispersed and (4) add the 3-halo-3,3-difluoropropene or 1,3-dihalo-1,1-difluoropropane. The addition order may be changed without disadvantageous effect. It is usually most desirable to add the difluorocarbon as the last component as a matter of operational convenience.

It is usually advantageous to maintain agitation of the reaction mixture for the entire period of the reaction as an alkali metal halide is precipitated during the course of the reaction. Thus, in order to maintain a generally uniform temperature throughout the reaction mixture, dispersion of the halide throughout the solution by agitating thereof may frequently be desirable.

The desired 3,3-difluoroallyl ester is generally separated from the reaction mixture by first washing the mixture with water to remove inorganic and organic salts and acids present; then separating the non-aqueous portion; and subsequently extracting the aqueous wash with dibutyl ether or the like to remove dissolved product. The ether extract and the non-aqueous portion of the reaction mixture are combined and the 3,3-difluoroallyl ester separated by fractional distillation.

An alternate method of synthesis of compounds in accordance with the invention is a formation of the ester by the reaction of 3,3-difluoroallyl alcohol with a carboxylic acid chloride. The reaction is readily carried out by placing equivalent quantities of 3,3-difluoroallyl alcohol and a carboxylic acid chloride in a solvent which is non-reactive with the reactants under the conditions of the reaction. Although generally it is advantageous to employ equivalent quantities of alcohol and carboxylic acid chloride the reaction readily takes place where an excess of one or the other is utilized. The 3,3-difluoroallyl alcohol in optimum yield should be substantially anhydrous in order to avoid hydrolysis of the acid chloride. Similarly solvents employed for the esterification should be substantially anhydrous to obtain maximum yields. Typical suitable solvents for the esterification are carbon tetrachloride, diethyl ether, acetone, dioxane, acetic anhydride and the like. Such solvents are generally rendered sufficiently water free by intimate contact with anhydrous sodium sulphate and similar dehydrating agents.

The order of addition of the reactants to the reaction vessel generally is not critical, however, it is generally advantageous to dissolve the carboxylic acid chloride or the 3,3-difluoroallyl alcohol in the solvent and add the remaining component thereto. If the 3,3-difluoroallyl alcohol and carboxylic acid chloride are added at the same time without solvent, the temperature of the reaction mixture may become excessive, leading to undesired by-products. Generally, the reaction should take place in an enclosed reactor wherein moisture and the external atmosphere is excluded.

The esterification reaction is advantageously carried out over a wide range of temperatures from about 0° to about 250° centigrade and beneficially between about 25° and 50° centigrade. At room temperature the reaction will generally proceed at a rate sufficient to provide substantially complete reaction between the alcohol and the acid chloride in a period of about 15–16 hours. The desired ester may be separated from the reaction mixture by distillation or when the product is relatively insoluble in the reaction mixture a solvent may be removed by distillation or filtration and the desired product may be separated by filtration. Depending upon the boiling point of the resultant product, it may be further purified by distillation or crystallization.

The following examples illustrate the invention, but are not to be construed as limiting thereof.

*Example I.—Preparation of 1-Bromo-3,3-Difluoropropene-1 and 3-Bromo-3,3-Difluoropropene-1*

A five-liter, round bottomed flask was fitted with a dropping funnel, an agitator and thermometer. The flask was charged with 1462 grams of 1,3-dibromo-1,1-difluoropropane, 500 milliliters of water, and 200 milliliters of Formula 30 ethanol (a mixture of 10 parts by volume 190 proof ethanol plus 1 part by volume methanol). A solution of 245 grams of sodium hydroxide in 450 milliliters of water was prepared and placed in the dropping funnel. The five-liter flask and contents were cooled to about 0° C. and maintained at this temperature while the contents of the dropping funnel were added over a period of about 45 minutes. While agitating, a temperature of 0° C. was maintained for a period of about one hour after addition of the sodium hydroxide solution was complete.

On standing, the reaction mixture separated into an aqueous layer and an oil-soluble layer, the aqueous layer was discarded and the oil layer was dried over anhydrous sodium sulphate.

Fractional distillation of the oil layer yielded 193 grams of 3-bromo-3,3-difluoropropene-1 (a yield of 21 percent based on 1,3-dibromo-1,1-difluoropropane) boiling over the range of 40 to 42° C. and having an index of refraction $n_d^{25}$ 1.3817. From this fractional distillation there was also obtained 49 grams (7 percent yield based on 1,3-dibromo-1,1-difluoropropane) of 3-bromo-3,3-difluoropropene-1 which boiled over the range of 60 to 64° C. and having an index of refraction $n_d^{23}$ 1.3987.

*Example III.—3,3-Difluoroallyl Acetate*

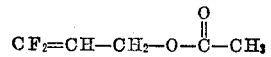

A two-liter, round-bottomed flask was fitted with a thermometer, an agitator and a reflux condenser. The flask was charged with 630 grams of anhydrous acetone, 176.0 grams of potassium acetate, 15.0 grams of potassium iodide, and 236.0 grams of 3-bromo-3,3-difluoropropene-1. For a period of 70 hours the flask and reaction mixture were maintained within the temperature range of 50 to 60° C. After cooling the reaction mixture to about 25° C., it was washed with water to remove water-soluble components.

The mixture, on standing, formed an oil-soluble layer and an aqueous layer. The layers were separated. The aqueous layer was then extracted with dibutyl ether and the ether evaporated. The ether extract and the oil layer were combined and dried over anhydrous calcium sulphate. Fractionation of the dried oil-soluble material yielded 101 grams (74 percent based on 3-bromo-3,3-difluoropropene) of 3,3-difluoroallyl acetate which boiled over the range of 100 to 102° C. Both infra-red and mass spectroscopic analyses confirmed the structure of the product.

*Example II.—3,3-Difluoroallyl Acetate*

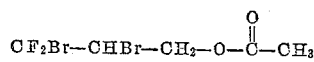

A 500 milliliter, round-bottomed flask was fitted with two dropping funnels, a thermometer and a reflux condenser. About 1000 grams of acetic acid and 29.0 grams of mercuric acetate were then thoroughly mixed in the reaction flask. The flask and contents were maintained at a temperature of about 20° C. while being agitated. About 22.0 grams of bromine and 39.0 grams of 3-bromo-3,3-difluoropropene-1 were added concurrently to the flask over a period of one and one-half hours. Agitation was maintained for an additional period of one and one-half hours.

On standing, the reaction mixture separated into two layers, a liquid layer and solid, inorganic layer. The reaction mixture was filtered, the solids discarded, the filtrate washed with water and then dried over anhydrous calcium sulphate.

On fractional distillation of the remaining oil-soluble material, there was obtained 12.5 grams of 2,3-dibromo-3,3-difluoropropyl acetate which boiled over the range of 70 to 72° C. at an absolute pressure of 10 millimeters of mercury.

Example IV.—3,3-Difluoroallyl Acetate $$CF_2=CH-CH_2-O-\overset{O}{\underset{\|}{C}}-CH_3$$

A 100 milliliter, round-bottomed flask was fitted with a thermometer and a reflux condenser. The flask was charged with 20.0 grams of absolute ethanol, 4.3 grams of granular zinc and 17 grams of 2,3-dibromo-3,3-difluoropropyl acetate. The flask was heated and its contents refluxed for a period of one hour. During this period, the temperature of the contents ranged from 76 to 83° C. At the end of the reflux period, the reaction mixture was cooled, washed with water and dried over anhydrous calcium sulphate.

Fractional distillation of the dried reaction mixture yielded 4 grams of 3,3-difluoroallyl acetate which boiled over the range of 57 to 59° C. under an absolute pressure of 150 millimeters of mercury and had an index of refraction $n_d^{25}$ 1.3724. Analyses by mass spectroscopy and infra-red techniques confirmed the formula and structure.

Example V.—3,3-Difluoroallyl Acetate $$CF_2=CH-CH_2-O-\overset{O}{\underset{\|}{C}}-CH_3$$

A five-liter, round-bottomed flask was fitted with an agitator, a thermometer and a reflux condenser. To the flask were added 238.0 grams of 1,3-dibromo-1,1-difluoropropane, 210 grams of potassium acetate, 8.0 grams of potassium iodide and 1400 milliliters of acetone. The contents of the reaction vessel were agitated for a period of 71 hours while being maintained at a temperature in the range of 55° C. to 60° C.

When agitation was stopped, a layer of precipitated solids was found on the bottom of the reaction flask. The remaining liquid was decanted and the acetone removed by evaporation.

Fractional distillation of residue from the evaporation step yielded 94 grams (70 percent based on 1,3-dibromo-1,1-difluoropropane) of 3,3-difluoroallyl acetate. The product boiled over the range of 57 to 59° C. at an absolute pressure of 150 millimeters of mercury and had an index of refraction $n_d^{25}$ 1.3724.

Example VI.—3,3-Difluoroallyl Benzoate

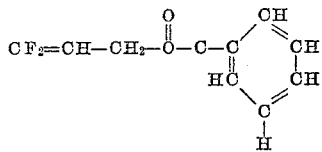

In a manner similar to Example II, with the exception that potassium benzoate was employed, 3,3-difluoroallyl benzoate was prepared with a yield of 57.6 percent. The 3,3-difluoroallyl benzoate boiled over the range of 107–108° C. under an absolute pressure of 20 millimeters of mercury and had an index of refraction $n_d^{25}$ 1.4819. The identity of the material was confirmed by infra-red and mass spectographic analyses.

Example VII.—Di(3,3-Difluoroallyl) Sebacate $$(CF_2=CH-CH_2-O-\overset{O}{\underset{\|}{C}})_2(CH_2)_8$$

In a manner similar to Example II, with the exception that potassium sebacate was employed instead of potassium acetate, di(3,3-difluoroallyl) sebacate was prepared. The product boiled over the range of 135 to 140° C. under an absolute pressure of 0.5 millimeter of mercury. The identity of the material was confirmed by infra-red and mass spectrographic analyses.

Example VIII.—3,3-Difluoroallyl Caproate $$CF_2=CH-CH_2-O-\overset{O}{\underset{\|}{C}}(CH_2)_4CH_3$$

In a manner similar to Example II, with the exception that potassium caproate was employed instead of potassium acetate, 3,3-difluoroallyl caproate was prepared. The product boiled over the range of 57° to 68° C. under an absolute pressure of 5.5 millimeters of mercury and had an index of refraction $n_d^{25}$ 1.3995. The identity of the material was confirmed by infra-red and mass spectrographic analyses.

Example IX.—3,3-Difluoroallyl Benzoate

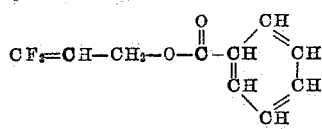

A steam heated, stainless steel, stirred autoclave having an internal thermocouple was charged with 0.7 mole of 3-bromo-1-chloro-1,1-difluoropropane, 620 milliliters of acetone (which had been previously dried over anhydrous calcium sulphate), 0.09 mole of potassium iodide and 1.4 moles of potassium benzoate. The autoclave was then maintained in the temperature range of 155–160° C. for a period of 20 hours. An autogenous pressure of 210–220 pounds per square inch gauge was generated in the reactor. At the end of the 20 hours heating period, the autoclave and contents were cooled to about 20° C., and dissolved in about 2 liters of water.

The resulting aqueous solution was then extracted with diethyl ether. The ether extract was washed with a 10 percent solution of potassium carbonate in water. The washed ether extract was then dried over anhydrous sodium sulphate. The ether was removed from the dried extract by evaporation and the residue fractionally distilled to yield 0.25 mole of 3,3-difluoroallyl benzoate which boiled over the range of 92 to 98° C. under an absolute pressure of 6 millimeters of mercury. It had an index of refraction $n_d^{25}$ 1.4835.

Example X.—3,3-Difluoroallyl Stearate $$CF_2=CH-CH_2-O-\overset{O}{\underset{\|}{C}}-(CH_2)_{16}CH_3$$

In a manner similar to Example II, with the exception that potassium stearate was employed as the carboxylic acid salt, 3,3-difluoroallyl stearate was prepared. The product boiled over the temperature range of 155 to 165° C. under an absolute pressure of 0.3 millimeter of mercury. It melted at about 25° C. The structure of the product was confirmed by both mass spectroscopy and infra-red spectrum analyses.

Example XI.—3,3-Difluoroallyl Trichloroacetate $$CF_2=CH-CH_2-O-\overset{O}{\underset{\|}{C}}-CCl_3$$

A 250 milliliter round bottomed flask fitted with a dropping funnel and a reflux condenser was charged with 75 milliliters of carbon tetrachloride and 20 grams of 3,3-difluoroallyl alcohol. About 40 grams of trichloroacetyl chloride were placed in the dropping funnel. The trichloroacetyl chloride was added dropwise to the carbon tetrachloride solution in the reaction vessel over a period of about 30 minutes. After the addition was completed, the reaction mixture was maintained at a temperature of about 25° centigrade for 16 hours. The carbon tetrachloride was evaporated under reduced pressure and the residue was fractionally distilled to yield 35 grams of 3,3-difluoroallyl trichloracetate boiling over the range of 92° to 107° centigrade, at 80 millimeters of mercury absolute pressure. The crude reaction product was distilled to yield a major fraction boiling over the range of 106° to 107° centigrade under 80 millimeters of mercury absolute pressure having an index of refraction $n_d^{25}$ of 1.4354 and a density $d_{25}^{25}$ of 1.45. The product was identified by infrared analysis as 3,3-difluoroallyl trichloroacetate.

*Example XII.—3,3-Difluoroalkyl 2,2-Dichloropropionate*

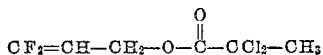

To 25 milliliters of anhydrous diethyl ether contained in a 125 milliliter glass stopper Erlenmeyer flask, 7 grams of 3,3-difluoroallyl alcohol boiling over the range of 93° to 98° centigrade were added and mixed together. To the ether solution were added 12 grams of 2,2-dichloropropionyl chloride dissolved in 25 milliliters of anhydrous diethyl ether. The mixture was maintained in a temperature of about 25° centigrade for a period of about 16 hours. At the end of this time the ether was removed under reduced pressure and the residue fractionally distilled in a 4 inch Todd column to yield approximately 8 grams of product having the following physical properties: boiling range about 95 to 96° centigrade under 60 millimeters of mercury absolute pressure, a refractive index of $n_d^{25}$ 1.422 and a density $d_{25}^{25}$ of 1.32. Elemental analysis of the product indicated:

|  | Found, percent | Calculated, percent |
|---|---|---|
| Carbon | 132.86+ | 32.8 |
| Hydrogen | 3.55 | 2.75 |
| Chlorine | 32.5 | 32.5 |

A structure of the product was verified to be 3,3-difluoroallyl 2,2-dichloropropionate by infra-red analysis.

*Example XIII.—3,3-Difluoroallyl 2,4-Dichlorophenoxyacetic*

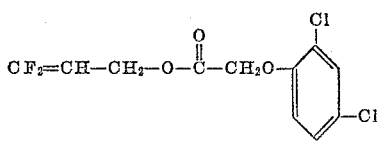

A 2 liter autoclave fitted with an agitator was charged with 140 grams of potassium 2,4-dichlorophenoxyacetic acid, 80 grams of 3-bromo-3,3-difluoropropene, 6 grams of potassium iodide and 1 liter of anhydrous acetone which had been dried over calcium chloride. The reaction mixture was heated to a temperature of 123° and agitated for 7 hours. At the end of this period a temperature was then reduced to about 250°. The reaction mixture was then filtered, acetone removed from the liquid portion thereof under reduced pressure and the remaining portion distilled under reduced pressure in a Clasian flask, the desired product boiled over a range of 146° to 164° centigrade under a pressure of from 0.3 to 0.4 millimeter of mercury absolute. Further purification of the product yielded a material boiling at 156° under 0.3 millimeter of mercury absolute pressure and having an index of refraction of $n_d^{32}$ of 1.5160. Infra-red analysis confirmed that the product was 3,3-difluoroallyl-2,4-dichlorophenoxyacetate.

*Example XIV.—3,3-Difluoroallyl 2,4,5-Trichlorophenoxyacetic*

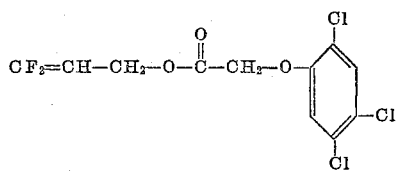

A 2 liter autoclave, fitted with a stirrer, was charged with 80 grams of 3-bromo 3,3-difluoropropene, 150 grams of potassium, 2,4,5-trichlorophenoxy acetate, 3 grams of potassium iodide, and 1 litre anhydrous acetone dried over calcium chloride. The reaction mixture was heated to a temperature of 123° centigrade for a period of 6 hours with agitation. At the end of this time the reactor and contents were cooled and insoluble materials removed from the reaction mixture by filtrating. Acetone was removed from the filtrate under reduced pressure leaving a solid residue which was recrystallized from carbon tetrachloride. The product 0.24 mole formed long colorless needles melting over the range of 62.8° to 64° centigrade. Infrared analysis of the crystalline material conformed the assigned structure of 3,3-difluoroallyl 2,4,5-trichlorophenoxy acetate.

*Example XV.—3,3-Difluoroallyl 2,4,5-Trichlorophenoxy-2-Propionate*

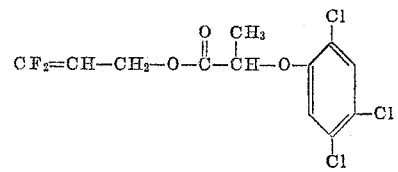

The experiment of procedure of Example XV was repeated with the exception that potassium 2,4,5-trichlorophenoxy-2-propionate was employed in place of 2,4,5-trichlorophenoxy acetate. 0.22 mole of an oily material was obtained which boiled over the range of 170° to 180° centigrade at 0.7 to 0.8 millimeter of mercury absolute pressure and melting over the range of 34° to 38° C. having a refractive index of $n_d^{32}$ of 1.5168. Infra-red analysis of the product indicated that it was 3,3-difluoroallyl 2,4,5-trichlorophenoxy-2-propionate.

In a manner similar to the foregoing examples, other 3,3-difluoroallyl esters are prepared. These include, for example, such products as:

3,3-difluoroallyl propionate,
3,3-difluoroallyl butyrate,
3,3-difluoroallyl pentanoate,
3,3-difluoroallyl heptanoate,
3,3-difluoroallyl octanoate,
3,3-difluoroallyl nonanoate,
3,3-difluoroallyl decanoate,
3,3-difluoroallyl undecanoate,
3,3-difluoroallyl dodecanoate,
3,3-difluoroallyl laurate,
3,3-difluoroallyl myristate,
3,3-difluoroallyl palmitate,
Di(3,3-difluoroallyl) malonate,
Di(3,3-difluoroallyl) succinate,
Di(3,3-difluoroallyl) glutarate,
Di(3,3-difluoroallyl) adipate,
Di(3,3-difluoroallyl) pimelate,
Di(3,3-difluoroallyl) suberate,
Di(3,3-difluoroallyl) azelate,
3,3-difluoroallyl toluate,
3,3-difluoroallyl phenylacetate,
3,3-difluoroallyl atropate,
3,3-difluoroallyl hydratropate,
3,3-difluoroallyl cinnamate,
3,3-difluoroallyl 4-tert.-butyl-benzoate,
3,3-difluoroallyl 2-tert.-butyl-benzoate,
3,3-difluoroallyl 4-butyl-benzoate,
3,3-difluoroallyl 3-ethyl-benzoate,
Bis(3,3-difluoroallyl) phthalate,
Bis(3,3-difluoroallyl) terephthalate,
3,3-difluoroallyl 2-nitrobenzoate,
3,3-difluoroallyl gallate,
3,3-difluoroallyl veratrate,
3,3-difluoroallyl vanillate,
3,3-difluoroallyl resorcylate,
3,3-difluoroallyl salicylate,
3,3-difluoroallyl 2-chlorobenzoate,
3,3-difluoroallyl 4-chlorobenzoate,
3,3-difluoroallyl formate, 3,3-difluoroallyl arachidate,
3,3-difluoroallyl acrylate,
3,3-difluoroallyl linoleate,
3,3-difluoroallyl lactate,
3,3-difluoroallyl glycolate,
3,3-difluoroallyl glyoxylate,
3,3-difluoroallyl pyruvate,
3,3-difluoroallyl acetoacetate,
3,3-difluoroallyl glycerate,
3,3-difluoroallyl glutanate,
the 3,3-difluoroallyl ester of glycine hydrochloride,
Tris-(3,3-difluoroallyl)tricarballylate,
3,3-difluoroallyl bromoacetate,
3,3-difluoroallyl iodoacetate,
3,3-difluoroallyl cyanoacetate,
3,3-difluoroallyl nicotinate,
3,3-difluoroallyl furoate,
3,3-difluoroallyl pyrrole-$\alpha$-carboxylate and
3,3-difluoroallyl picolinate.

An alternate synthesis of the 3,3-difluoroallyl esters of the invention was employed as a means of structure proof. This alternative route is schematically illustrated by the following reactions:

$$CF_2Br-CH=CH_2 + Br_2 + Hg(O-\overset{O}{\underset{\|}{C}}-CH_3)_2 \quad R-\overset{O}{\underset{\|}{C}}-OH \longrightarrow$$

$$CF_2Br-CHBr-CH_2-O\overset{O}{\underset{\|}{C}}-R \xrightarrow{Zn} CF_2=CH-CH_2O-\overset{O}{\underset{\|}{C}}-R$$

The new 3,3-difluoroallyl products of the present invention are effective as insecticides. As indicated, they are adapted to be employed for the control of a wide range of agricultural and household pests. They may be applied to growing vegetation in amounts required for insect control with negligible injury to plant foliage. For such parasiticidal use, the products may be dispersed on a finely divided solid carrier and employed as dusts. Also, such mixtures may be dispersed in water with the aid of a wetting agent, and the resulting aqueous suspensions employed as sprays. In other procedures, the new products may be employed in oils, as constituents of oil in water emulsions, or in water dispersions with or without the addition of emulsifying, wetting, or dispersing agents. Suitable concentrations of the toxicants in dusts are in the order of from about 0.1 to 10 percent by weight of the dust, and in liquid suspensions from about 0.10 to 2 pounds per 100 gallons of the spray mixture.

Aqueous spray compositions containing the 3,3-difluoroallyl products of the preceding examples have been tested against two-spotted spider mite, bean aphid, American cockroach, housefly and confused flour beetle. Such compositions have been found effective against the test organisms at toxicant concentrations of from 0.1 to 1 pound per 100 gallons of spray mixture. With the products, a 100 percent kill of all four test organisms has been obtained with aqueous sprays containing from 0.25 to 1 pound of the toxicant per 100 gallons. One hundred percent kills in 48 hours have been obtained by allowing the insects to feed upon white flour containing 1 percent or less by weight of many of the new products.

In a representative operation, a concentrate was prepared by mixing together 60 parts by weight of a product consisting essentially of 10 parts of dioctyl ester of sodium sulfosuccinic acid ("Aerosol OT") and 30 parts of refined kerosene. This concentrate was dispersed in water to form spray compositions. One hundred percent kills of two-spotted spider mite and bean aphid were obtained with a toxicant concentration of 0.5 pound per 100 gallons of spray.

The biological activity and biocidal efficacy of the esters of the invention are primarily associated with the 3,3-difluoroallyl group and is not substantially modified by the carboxylic acid employed in synthesizing the esters. The 3,3-difluoroallyl alcohol is particularly effective, and for application where extended stability is required the esters are benficially employed.

What is claimed is:

1. A compound selected from the group consisting of 3,3-difluoroallyl alcohol and carboxylic acid esters thereof.

2. A compound selected from the group consisting of 3,3-difluoroallyl alcohol and esters thereof of the formula:

$$(CF_2=CH-CH_2-O-\overset{O}{\underset{\|}{C}})_n-R$$

wherein R is an organic radical containing from 1 to about 20 carbon atoms and $n$ is an integer from 1 to 3.

3. The ester of claim 2, wherein said organic radical contains an aromatic ring.

4. 3,3-difluoroallyl esters of the fodmula:

$$CF_2=CH-CH_2-O-\overset{O}{\underset{\|}{C}}-R$$

wherein R is an aliphatic hydrocarbon radical containing up to 20 carbon atoms.

5. 3,3-difluoroallyl esters of the formula:

$$CF_2=CH-CH_2-O-\overset{O}{\underset{\|}{C}}-R$$

wherein R is a hydrocarbon organic radical containing one aromatic ring and up to 10 carbon atoms.

6. 3,3-difluoroallyl esters of the formula:

$$(CF_2=CH-CH_2-O-\overset{O}{\underset{\|}{C}})_2R$$

wherein R is a divalent aliphatic hydrocarbon radical containing up to 20 carbon atoms.

7. 3,3-difluoroallyl alcohol of the formula:

$$CF_2=CH-CH_2-OH$$

8. 3,3-difluoroallyl acetate of the formula:

$$CF_2=CH-CH_2-O-\overset{O}{\underset{\|}{C}}-CH_3$$

9. 3,3-difluoroallyl caproate of the formula:

$$CF_2=CH-CH_2-O-\overset{O}{\underset{\|}{C}}-CH_2CH_2CH_2CH_2CH_3$$

10. 3,3-difluoroallyl stearate of the formula:

$$CF_2=CH-CH_2-O-\overset{O}{\underset{\|}{C}}-(CH_2)_{16}-CH_3$$

11. 3,3-difluoroallyl benzoate of the formula:

$$CF_2=CH-CH_2-O-\overset{O}{\underset{\|}{C}}-C_6H_5$$

12. Di(3,3-difluoroallyl) sebacate of the formula:

$$(CF_2=CH-CH_2-O-\overset{O}{\underset{\|}{C}})_2(CH_2)_8$$

13. 3,3-difluoroallyl trichloroacetate of the formula:

$$CF_2=CH-CH_2-O-\overset{O}{\underset{\|}{C}}-CCl_3$$

14. 3,3-difluoroallyl 2,2-dichloropropionate of the formula:

$$CF_2=CH-CH_2-O-\overset{O}{\underset{\|}{C}}-CCl_2-CH_3$$

15. 3,3-difluoroallyl 2,4-dichlorophenoxyacetate of the formula:

$$CF_2=CH-CH_2-O-\overset{O}{\underset{\|}{C}}-CH_2-O-C_6H_3Cl_2$$

16. 3,3-difluoroallyl 2,4,5-trichlorophenoxyacetate of the formula

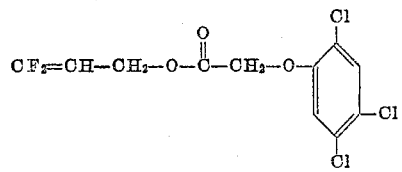

17. 3,3-difluoroallyl 2-(2,4,5-trichlorophenoxy) propionate of the formula:

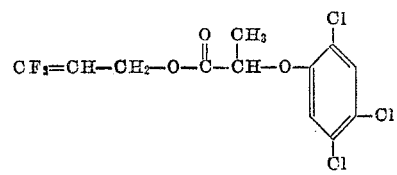

18. A method for the preparation of an ester of 3,3-difluoroallyl alcohol and a carboxylic acid, which method comprises taking a dispersion of an alkali metal salt of a carboxylic acid, wherein the alkali metal has an atomic number of from 3 to 37, said dispersion being in a solvent that is substantially non-reactive with the reactants and the products of the reaction under the conditions of the reaction; adding to the dispersed salt a halodifluorocarbon, said halodifluorocarbon is a compound of carbon, hydrogen, fluorine and a halogen X of atomic number from 17 to 53, having a 3 carbon atom chain, two fluorine atoms and one X atom attached to one of its terminal carbon atoms, at least three hydrogen atoms attached to the other two carbon atoms and not more than one other X atom of atomic number from 17 to 53, attached to a carbon atom which also carries 2 hydrogen atoms; then subjecting the resulting mixture to heat at a temperature between about 0° C. and about 250° C. until at least a portion of said salt and said halodifluorocarbon react.

19. The method of claim 18, wherein said halodifluorocarbon contains an ethylenically unsaturated linkage.

20. A method for the preparation of an ester of 3,3-difluoroallyl alcohol and a carboxylic acid, which method comprises taking a dispersion of an alkali metal salt of an acid having the formula:

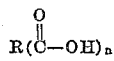

wherein R is a hydrocarbon radical containing from 1 to 20 carbon atoms and n is an integer from 1 to 2, and the alkali metal has an atomic number of from 3 to 37, said dispersion being in a solvent that is substantially non-reactive with the reactants and the products of the reaction under the conditions of the reaction; adding to the dispersed salt, a halodifluorocarbon, which is a compound of carbon, hydrogen, fluorine and a halogen X of atomic number from 17 to 53, having a 3 carbon atom chain, two fluorine atoms and one X atom attached to one of its terminal carbon atoms, at least three hydrogen atoms attached to the other two carbon atoms and not more than one other X atom of atomic number from 17 to 53, attached to a carbon atom which also carries 2 hydrogen atoms; then subjecting the resulting mixture to heat at a temperature between about 0° C. and about 250° C. until at least a portion of said salt and said halodifluorocarbon react.

21. The method of claim 20, wherein R is a hydrocarbon radical containing from 1 to 20 carbon atoms and said halodifluorocarbon contains an ethylenically unsaturated linkage.

22. A method for the preparation of an ester of 3,3-difluoroallyl alcohol and a carboxylic acid, which method comprises taking a dispersion of an alkali metal salt of an acid having the formula

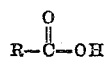

wherein R is an aliphatic radical containing 1 to 20 carbon atoms and the alkali metal has an atomic number of from 23 to 37, said dispersion being in a solvent that is substantially non-reactive with the reactants and the products of the reaction under the conditions of the reaction, adding to the dispersed salt, a halodifluorocarbon which is a compound of carbon, hydrogen, fluorine and a halogen X of atomic number from 17 to 53, having a 3 carbon atom chain, two fluorine atoms and one X atom attached to one of its terminal carbon atoms, at least three hydrogen atoms attached to the other two carbon atoms, not more than one other X atom of atomic number from 17 to 53, attached to a carbon atom which also carries 2 hydrogen atoms; then subjecting the resulting mixture to heat at a temperature between about 0° C. and about 250° C. until at least a portion of said salt and said halodifluorocarbon react.

23. The method of claim 22, wherein said halodifluorocarbon contains an ethylenically unsaturated linkage.

24. A method for the preparation of an ester of 3,3-difluoroallyl alcohol and a carboxylic acid, which method comprises taking a dispersion of an alkali metal salt of an acid having the formula:

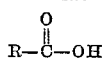

wherein R is a hydrocarbon radical containing 1 aromatic ring and up to 10 carbon atoms, and the alkali metal has an atomic number of from 3 to 37, said dispersion being in a solvent that is substantially non-reactive with the reactants and the products of the reaction under the conditions of the reaction, adding to the dispersed salt a halodifluorocarbon which is a compound of carbon, hydrogen, fluorine, and halogen X of atomic number from 17 to 53, having a 3 carbon atom chain, two fluorine atoms and one X atom attached to one of its terminal carbon atoms, at least three hydrogen atoms attached to the other two carbon atoms, not more than one other X atom of atomic number from 17 to 53, attached to a carbon atom which also carries 2 hydrogen atoms; then subjecting the resulting mixture to heat at a temperature between about 0° C. and about 250° C. until at least a portion of said salt and said halodifluorocarbon have reacted.

25. The method of claim 24, wherein said halodifluorocarbon contains an ethylenically unsaturated linkage.

26. A method for the preparation of an ester of 3,3-difluoroallyl alcohol and a carboxylic acid, which method comprises taking a dispersion of an alkali metal salt of an acid having the formula:

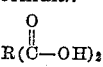

wherein R is a divalent hydrocarbon radical containing up to 20 carbon atoms and the alkali metal has an atomic number of from 3 to 37, said dispersion being in a solvent that is substantially non-reactive with the reactants and the products of the reaction under the conditions of the reaction, adding a halodifluorocarbon which is a compound of carbon, hydrogen, fluorine, and a halogen X of atomic number from 17 to 53, having a 3 carbon atom chain, two fluorine atoms and one X atom attached to one of its terminal carbon atoms, at least three hydrogen atoms attached to the other two carbon atoms, not more than one other X atom of atomic number from 17 to 53, attached to a carbon atom which also carries 2 hydrogen atoms; then subjecting the resulting mixture to heat at a temperature between about 0° C. and about 250° C. until at least a portion of said salt and said halodifluorocarbon have reacted.

27. The method of claim 26, wherein said halodifluorocarbon contains an ethylenically unsaturated linkage.

References Cited in the file of this patent
UNITED STATES PATENTS
2,613,221    Ladd et al. _____ Oct. 7, 1952